Dec. 23, 1941.  G. T. MARKEY  2,267,244
ONCE A WEEK HATCHER
Filed Feb. 10, 1939  3 Sheets-Sheet 1
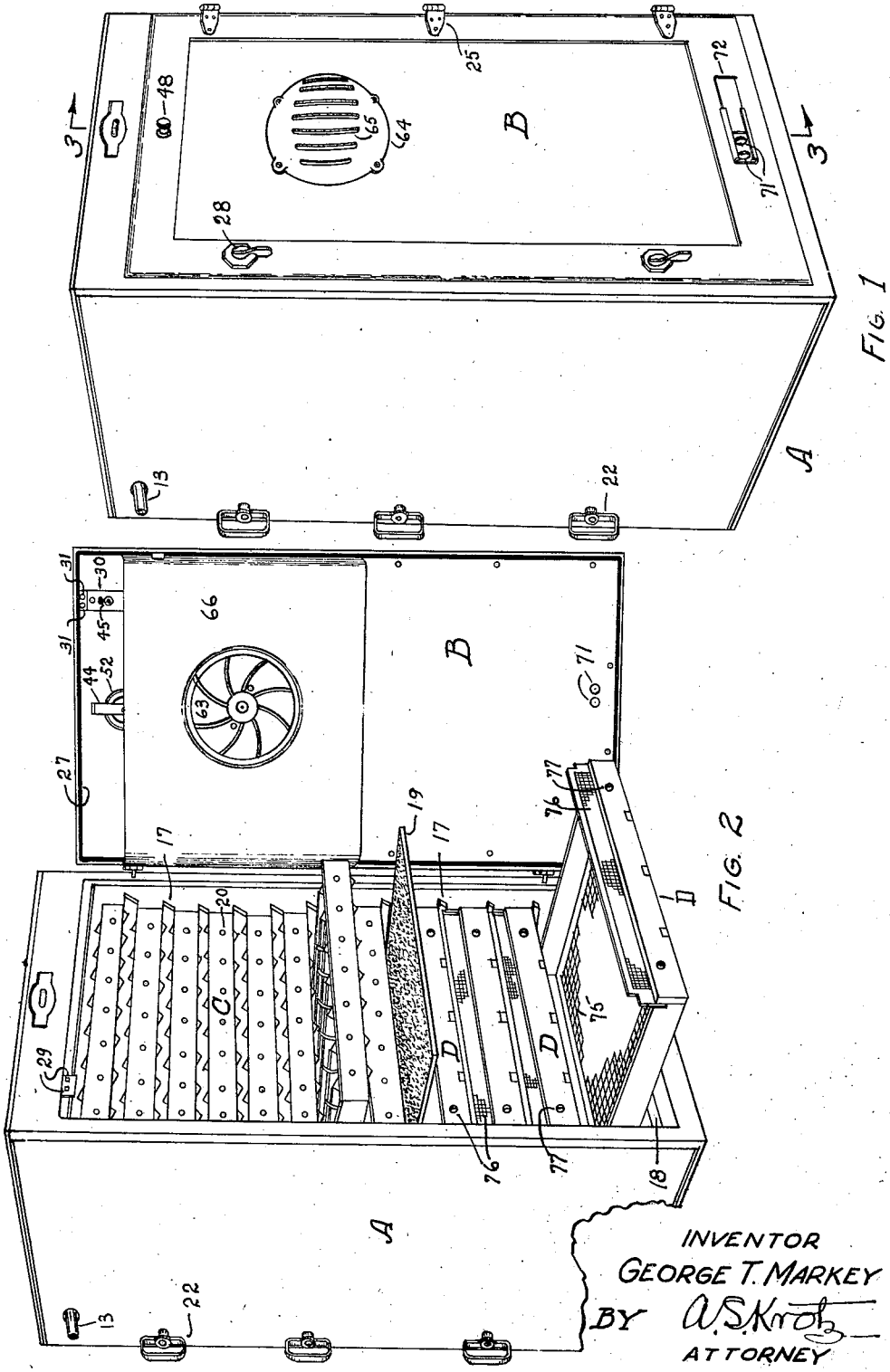

Dec. 23, 1941.    G. T. MARKEY    2,267,244
ONCE A WEEK HATCHER
Filed Feb. 10, 1939    3 Sheets-Sheet 2

INVENTOR
GEORGE T. MARKEY
BY A.S.Kroh
ATTORNEY

Dec. 23, 1941.    G. T. MARKEY    2,267,244
ONCE A WEEK HATCHER
Filed Feb. 10, 1939    3 Sheets-Sheet 3
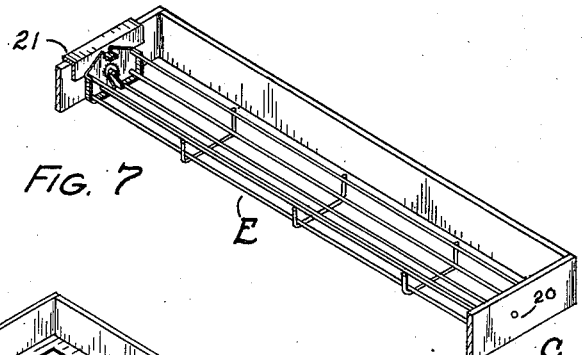
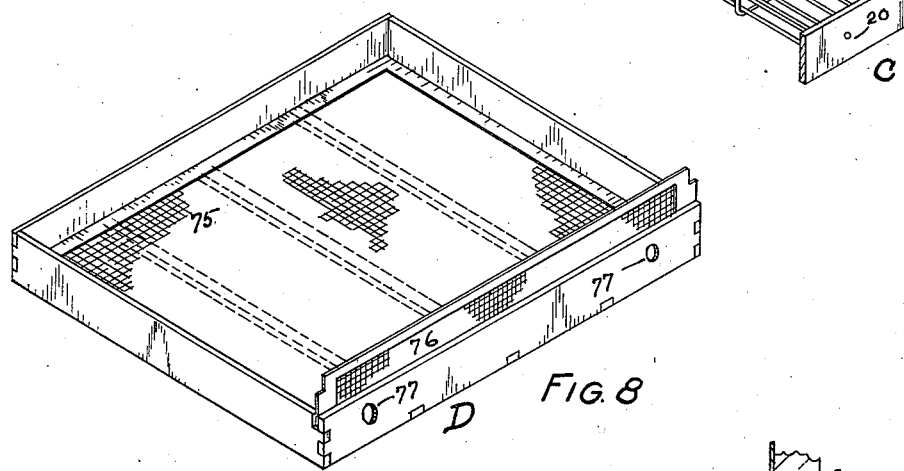
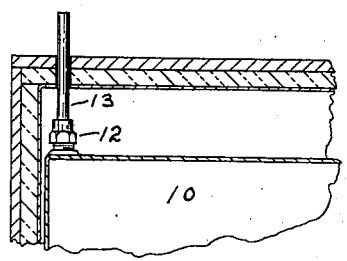
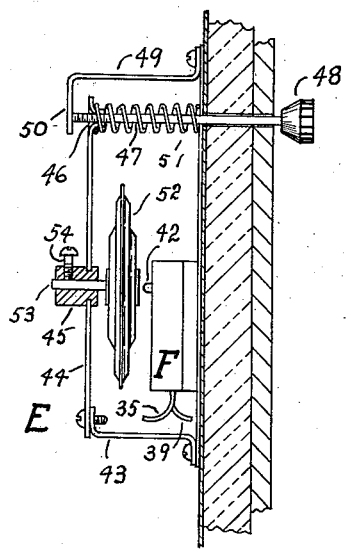
INVENTOR
GEORGE T. MARKEY
BY A. S. Krotz
ATTORNEY Patented Dec. 23, 1941

2,267,244

UNITED STATES PATENT OFFICE 2,267,244

ONCE A WEEK HATCHER

George T. Markey, Fort Atkinson, Wis., assignor to James Manufacturing Company, Fort Atkinson, Wis., a company of Wisconsin Application February 10, 1939, Serial No. 255,634

8 Claims. (Cl. 119—37)

The present invention relates to a cabinet having groups of incubating and hatching trays and means whereby when the eggs in an incubating tray reach the hatching or pipping period, they may be removed and placed in a hatching tray, a suitable number of incubating and hatching trays being provided whereby there will always be one or more hatching trays ready for the eggs when they are ready to hatch.

An object of the present invention is to provide means whereby the air in the cabinet is recirculated and a certain volume of outside air is admitted and mixed with the recirculated air and an equal volume is discharged from the cabinet and wherein the circulating air is suitably heated, humidified and then caused to move between the eggs in the trays.

Another object of the present invention is to group the hatching trays in the bottom of the cabinet having an air filter whereby the air that passes through the hatching trays is caused to be filtered before it returns to the incubating compartment and fan.

A novel feature of the present invention is the arrangement whereby all of the recirculated and outside air is caused to pass the resister and at least part of the recirculated air is then caused to pass the thermal control device before it reaches the trays.

Further novel features of the present invention are that the incubating and hatching trays may be removed and replaced in a unitary cabinet drawer-like and wherein a pan is positioned below the hatching trays which may also be removed drawer-like and used for the purpose of catching droppings or as an additional humidifier.

A still further object of the present invention is to position the motor in a slightly larger aperture in the door and provide a fan which is adapted to cause a desired volume of outside air to enter the cabinet through this aperture and having an electric heating element positioned within the outlet of the fan thus to reheat the air discharged from the fan.

To these and other useful ends my invention consists of parts, combinations of parts, or their equivalents, and mode of operation, as hereinafter described and claimed and shown in the accompanying drawings in which:

Fig. 1 is a perspective view of my complete device.

Fig. 2 is a perspective view of the device shown in Figure 1 having the door open and two of the trays and the filter pad partially removed.

Fig. 6 is an enlarged side elevation of the thermal device showing a fraction of the thermal base and the door in section.

Fig. 7 is a fractional isometric view of an egg tray showing one of the egg carrying baskets in position.

Fig. 8 is an isometric view of one of the hatching trays.

Fig. 9 is a fractional sectional view of the cabinet taken on line 9—9 of Figure 3 illustrating one of the water connections to the evaporator pan.

Figure 3:
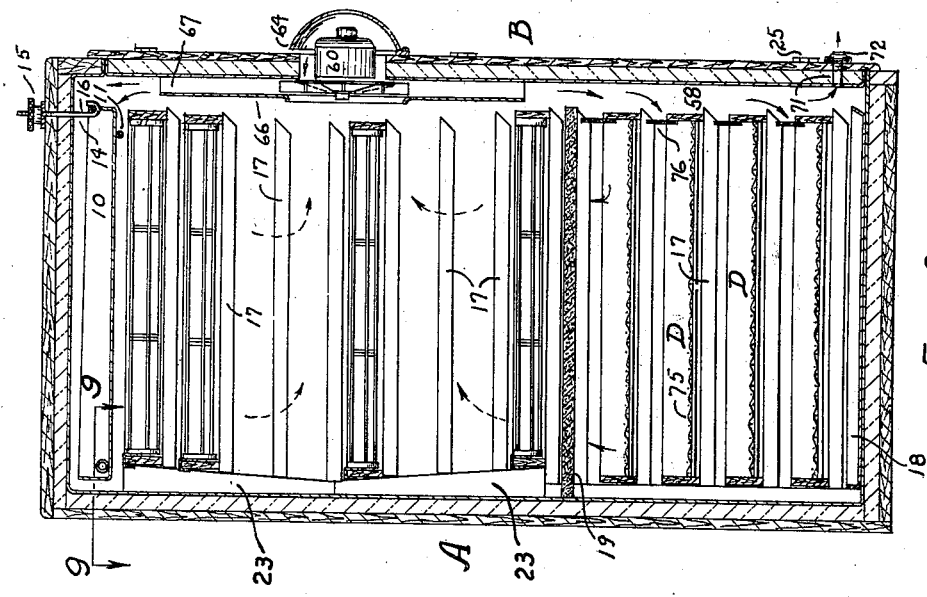
Fig. 3 is a section of the device taken on a fore and aft center line as at 3—3 of Figure 1.

As thus illustrated, my improved incubator and hatching device comprises the cabinet which in its entirety is designated by reference character A comprising a front door which in its entirety is designated by reference character B.

Member A comprises heavily insulated walls as is the custom in devices of the class (see Figure 3) and is provided at its top with a water pan 10 having a fixed support 11 at its front end. The rear end of this pan is supplied at opposite sides with screw threaded unions 12 having outlet pipes 13. Thus pipes 13 will act as a pivotal support for the rear end of the pan and as a means for supplying water to the pan from one side and a drain or overflow trap at the other side, the custom being to provide a water supply valve on one side and a trap at the other side positioned to thereby permit the water to fill the pan to a predetermined level.

I provide means for adjusting the angle of pan 10 in the form of a bolt 14 having a nut 15 and being hooked into the top edge of the pan as at 16. Thus when the pan is in the position shown in Figure 3, the entire bottom will be covered with water exposing a maximum surface, the pan being in the path of the recirculated air so as to provide maximum evaporation when needed.

To regulate evaporation, the front end of pan 10 is lifted more or less. When in its highest position, only a small area of water will be left in the pan which is exposed to the circulating air. Thus I have provided a convenient means for controlling the humidity of the air in the cabinet.

I provide spaced strips 17 on the opposite side walls of the cabinet as supports for the incubating and hatching trays as clearly illustrated in Figures 2 and 3.

The incubating trays in their entirety are designated by reference character C and the hatching trays are, in their entirety designated by reference character D. The trays are slidably supported by members 17 and may, therefore, be moved in and out of the cabinet drawer-like. Vertical strips 23—23, their front edges being at oblique angles are provided as stops for the incubating trays, thus leaving more space between the center tray and member 66 than the upper and lower trays, thus to act to equalize the passage of air between the trays.

I position a pan 18 in the bottom of the cabinet (see Figure 3) which may act to catch any material that may fall from the hatching trays and when it is necessary, a quantity of water may be added so as to further add humidity to the passing air.

I provide a filter pad 19 which is positioned as clearly illustrated in Figures 2 and 3 and being supported and adapted to be moved in and out of the cabinet drawer-like. The air around freshly hatched chicks is more or less contaminated. This air must, as it leaves the hatching compartment, pass through filter 19 before it can come in contact with the eggs in the incubating trays. Trays C are provided with a number of egg racks or cages which in their entirety are designated by reference character E. These cages are rotatably supported on pins 20 as is the custom in devices of the class, each tray having mounted on its rear wall a cage shifting member 21 having a connection to a shaft which protrudes through the side wall of the cabinet and having secured to their protruding ends, hand grips 22 (see Figure 2).

Thus the cages may be rocked to the right or left from the outside of the cabinet. It will be noted that in the figures I illustrate four hatching trays D below the filtering pad 19 and eight incubating trays C above this pad. This is about the number of hatching and incubating trays with which to secure the desired results as will hereinafter appear.

Door B is heavily insulated and hingedly supported to the cabinet as at 25. The door is offset around its periphery whereby a considerable portion extends into the cabinet when the door is closed.

I provide a rubber sealing strip 27 and suitable door latches 28 providing means for snugly pressing the rubber strip against the face of the cabinet thus to seal the cabinet as is the custom with refrigerators and devices of the class.

Two spaced electric contact surfaces 29—29 are positioned as illustrated in Figure 2. These contacts have wires which lead into a socket at a convenient place on the exterior of the cabinet. A contact box 30 is secured to the door having spaced contact points 31—31 which are mounted on flat springs 32 and being at their lower ends supported by and insulated from member 30 (see Figure 4). Each spring is therefore insulated and held in position by means of bolts 33 under the heads of which are positioned wire terminals 34—34.

Contact points 31 are positioned so when the door is closed, a yielding electrical connection is made from terminals 29 to terminal clips 34.

A wire 35 leads to a terminal 36 on the thermally controlled switch which in its entirety is designated by reference character F, (see Figure 6). Wire 35 also leads to one of the terminals on the motor (see Figure 4). The other terminal 37 on the thermal switch is connected to resistor 38 by means of wire 39. The other end of the resistor is connected to terminal 34 by means of wire 40. Wire 40 also leads to the other motor terminal.

The thermal device comprises the switch F which is operated by pressure against projection 42 whereby when sufficient pressure is exerted against this member, switch F will be opened thus to sever the connection between wires 35 and 39. When this pressure is released, the switch will again be closed by a spring pressure within the switch in a manner too well known to require further description.

A bracket 43 is mounted on the inside face of the door to which is secured, as illustrated, a plate 44 having a sleeve 45 secured thereto, the upper end of member 44 having a screw threaded opening 46 into which bolt 47 is screw threaded. This bolt is extended through an opening in the door and has on its outer end a knurled nut 48. A bracket 49 is mounted on the door as illustrated, having a depending portion 50.

A spring 51 is provided whereby the end of the bolt 47 is pressed against member 50. Thus the position of the upper end of member 44 may be moved in either direction by turning knurled nut 48.

I provide a wafer 52 having therein a thermally sensitive liquid and being mounted on a stem 53 which is adapted to hold the wafer in any desired position by means of screw 54. Thus when the wafer is suitably positioned, switch F will be opened and closed by expansion and contraction of the wafer caused by the change in temperature of the passing air. Thus resistor 38 will be connected into and out of circuit according to the temperature of the recirculated air when the door is closed.

Figure 4:
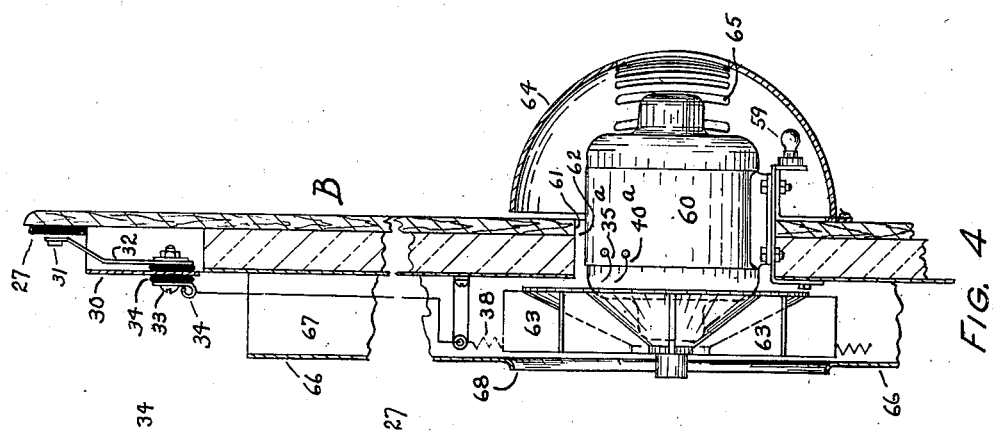
Fig. 4 is an enlarged fractional section of the door taken on line 4—4 of Figure 5.

I provide a motor 60 which is preferably concentrically mounted in an opening 61 in door B as illustrated in Figure 4 providing an annular air space 62. On the inner end of the motor shaft I mount a centrifugal fan having fan blades 63.

A decorative cap 64 is secured to the front of door B having openings 65, the cap shielding the motor and providing means for a limited volume of air which the fan is adapted to draw into the cabinet through the relatively small annular opening 62. A pilot light 59 is provided having a connection (not shown) to wires 39 and 40 whereby the operator may observe when the resister is in circuit.

I provide a metal partition 66 which is supported on the door as illustrated by means of flanges 67. Member 66 is spaced a suitable distance from the door and is provided with an opening 68.

By referring to Figure 3, it will be noted that the bottom outlet to the duct provided by member 66 is only a short distance above member 19 and that the space between the front end of member 19, and this outlet, is largely closed by the bottom incubating tray. Thus most of the air discharged downwardly from duct 67, will pass below member 19 and circulate between the hatching trays and pass upwardly through these members so the air which passes between and through the hatching trays must also pass through filter 19 before reaching the incubator compartment. This movement of the air is clearly illustrated by arrows.

Thus it will be seen that air will be drawn from the cabinet through opening 68 and discharged centrifugally by the fan. Part of the air will be discharged over the top of member 66 and part under the bottom of this member but all of the air will pass the resister 38 thus the circulating air will be heated by a thermally controlled resister.

The movement of the air is indicated by curvilinear arrows in Figure 3. It will be seen that some of the air passes through trays C and a portion of the circulated air passes down through air passageway 58 and into and up through trays D. The air that passes through trays D is forced upwardly through filter plate 19.

Figure 5:
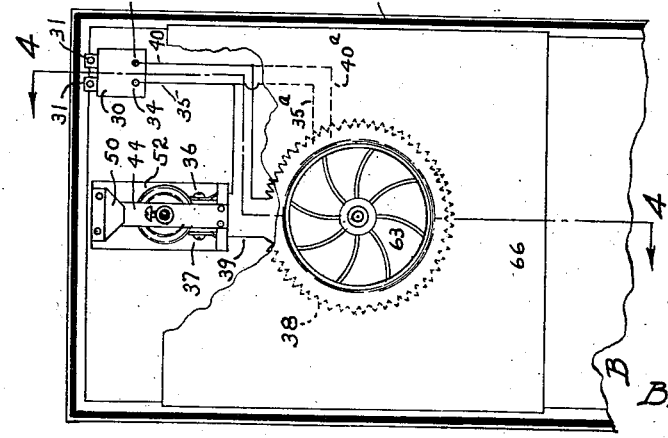
Fig. 5 is a rear view of a fraction of the door having a portion of the air directing partition removed so as to illustrate the thermal device and its connections to the thermal switch and resister.

The fan motor is connected to terminals 34 by means of wires 35, 40, 35a and 40a (see Figures 4 and 5). Thus it will be seen that when the door is closed, the fan motor will operate continuously and that the resister will operate intermittently according to the temperature of the circulating air. Fan blades 63 act to create a slight air pressure within the cabinet.

Near the bottom of door B is positioned one or more openings 71 (see Figures 1 and 2) and a slide valve 72 is mounted on the outside of the door whereby the operator may adjust the quantity of escaping air. The design is such as will supply a complete change of air about every fifteen minutes more or less according to the position of valve 72.

Trays D (see Figure 8) are provided with wire screen bottoms 75 and screens 76 are adapted to fill the spaces between the fronts of the trays. These trays are provided with spaced apertures 77 which may be used for a draw pull. These apertures and screens 76 will permit the recirculated air to pass into the trays as indicated by arrows. Screens 76 are formed in separate units so they may be easily removed and replaced for convenience in handling the trays. Screens 75 may also be made in separate units so as to be easily removed from the tray frame for cleaning purposes.

In operation, all of the cages E of a tray may be filled with eggs and the cages rocked at suitable intervals from one side to the other as is the custom in modern incubators. After the eggs in a tray have been exposed to a suitable temperature for say 19 days or when they are ready to hatch, they are moved to a tray D where they are left until the chicks are hatched and ready to be placed in a brooder. The time required during the incubating period is six or eight times as long as required in the hatching trays. Thus four hatching trays will be sufficient to serve eight or more incubating trays.

It will be understood that trays C may first be filled with fresh eggs at suitable intervals, whereby time will be allowed for the transfer of eggs from trays C to trays D so as to bring about a complete hatching cycle once a week.

In case additional moisture is needed for the hatching process, some water may be added to pan 18. This pan will also act to collect any droppings from the hatching trays and filter 19 will answer to filter the air as it passes from the hatching trays to the incubating space.

It will be seen therefore, that my device is a complete unit suitable for incubating and hatching and the adjustments and operation of the device are simple and easily understood.

Clearly many minor detail changes may be made without departing from the spirit and scope of the present invention as recited in the appended claims. For example, the motor, fan and trays may be positioned differently, the number and size of the trays may be changed and the air outlet may be moved to some other position. Furthermore, my device may be equipped with trays adapted to act as both incubating and hatching trays.

Having thus shown and described my invention, I claim:

1. A device of the class described, comprising a cabinet having a door and means whereby a number of trays may be positioned horizontally drawer-like therein, said door having an opening therethrough and a motor mounted therein to thereby form an annular air inlet, a fan mounted on the inner end of the motor shaft the blades extending radially a distance past the wall of said opening, their front edges being adjacent the rear surface of the door, a partition forming a vertical open end air duct mounted on said door and being positioned adjacent the rear of said fan and having an air inlet concentric with the fan whereby air is drawn from said cabinet and discharged from the top and bottom of said partition, a resister positioned adjacent the peripheral edge of said fan, and a thermally controlled switch positioned in the path of the recirculated air and having an operative connection to said resister.

2. A device as recited in claim 1 including; a number of incubating and hatching trays, said incubating trays being positioned in the top of said cabinet, said hatching trays being positioned in the bottom of the cabinet, the top hatching tray being positioned near the horizontal plane of the bottom of said air duct, the front edges of said hatching trays being spaced from said door to thereby provide an air passageway from said air duct.

3. A device as recited in claim 1 including; a number of incubating and hatching trays, said incubating trays being positioned in the top of said cabinet, said hatching trays being positioned in the bottom of the cabinet, and a removably mounted air filter positioned between adjacent incubating and hatching trays, whereby a portion of the recirculated air will be caused to pass through said hatching trays and then through said air filter in its return passage to said fan.

4. A device as recited in claim 1 including; a number of incubating and hatching trays, said incubating trays being grouped in the top of said cabinet, said hatching trays being grouped in the bottom of said cabinet, and a removably mounted air filter positioned between adjacent incubating and hatching trays, the front ends of said hatching trays and filter being spaced from said door to thereby provide a downwardly extending air passageway from said air duct.

5. A device as recited in claim 1 including; a number of incubating and hatching trays, said incubating trays being grouped in the top of said cabinet, said hatching trays being grouped in the bottom of said cabinet, a removably mounted air filter positioned between adjacent incubating and hatching trays, the front ends of said hatching trays and filter being spaced from said door to thereby provide an air passageway from the space formed between said door and partition, an air outlet in said door from said air passageway whereby a predetermined volume of outside air is admitted into the cabinet and an equal volume of recirculated air is discharged from the cabinet.

6. A device as recited in claim 1 including; a number of incubating and hatching trays positioned in spaced relation in said cabinet, said incubating trays being grouped in the upper portion of said cabinet, said hatching trays being grouped in the lower portion of said cabinet, the front edges of said hatching trays being spaced a short distance from said door to thereby form an air passageway extension from the bottom of said air duct, a filter pad positioned between said incubating and hatching trays adapted to fill the space within said cabinet except a space corresponding with said last air passageway whereby air will be discharged from the lower outlet of said air duct and will pass through said air passageway through said hatching trays and through said filter pad on its return to the chamber occupied by said incubating trays.

7. A device of the class described, comprising a cabinet and a door therefor, a number of incubating and hatching trays, means whereby said trays may be inserted and removed from the cabinet drawer like, said trays being positioned to thereby leave a space between their front edges and said door for an air passageway, the larger number of said trays being incubating trays and positioned in the top of said cabinet, the remainder of the trays being hatching trays and positioned in the bottom of the cabinet, a filter pad positioned between said incubating and hatching trays filling the cabinet transversely except a space registering with said air passageway, an opening in said door having positioned therein a motor, the motor being somewhat smaller than the opening to thereby provide a relatively small annular air inlet space, a fan secured to the inner end of the shaft of said motor the blades of which extend radially past the wall of said opening, a partition positioned adjacent the inner edge of said fan and terminating at its top near the top incubating tray and at its bottom adjacent said filter pad, an opening in said partition concentric with said fan whereby air will be drawn through said opening and annular inlet and discharged at the top of said partition and circulated through and between said incubating trays and whereby air will be discharged at the bottom of said partition into said air passageway and caused to pass between and through said hatching trays and through said filter, and an opening in said cabinet whereby a quantity of recirculated air may escape from said cabinet to thereby permit an equal quantity of outside air to enter said cabinet through said annular inlet.

8. A device as recited in claim 1 including; a number of incubating and hatching trays, said incubating trays being positioned in the upper portion of said cabinet, said hatching trays being positioned in the lower portion of said cabinet, the upper and lower trays of said incubating trays being positioned adjacent the upper and lower ends of said air duct and being spaced close to the outlets thereof, the intermediate incubating trays being positioned toward the center at a gradually increased distance from said air duct to thereby form an air passageway longitudinal to said air duct having its greatest width adjacent the axis of said fan.

GEORGE T. MARKEY.